(12) United States Patent
Freese

(10) Patent No.: US 7,184,554 B2
(45) Date of Patent: Feb. 27, 2007

(54) WIRELESS DEVICE MANAGEMENT

(75) Inventor: Esko Freese, Hägersten (SE)

(73) Assignee: F-Secure Oyj, Helsinki (FI)

( * ) Notice: Subject to any disclaimer, the term of this patent is extended or adjusted under 35 U.S.C. 154(b) by 679 days.

(21) Appl. No.: 10/363,040

(22) PCT Filed: Aug. 20, 2001

(86) PCT No.: PCT/EP01/09644

§ 371 (c)(1),
(2), (4) Date: Feb. 28, 2003

(87) PCT Pub. No.: WO02/19116

PCT Pub. Date: Mar. 7, 2002

(65) Prior Publication Data

US 2004/0010579 A1    Jan. 15, 2004

(30) Foreign Application Priority Data

Aug. 31, 2000    (GB) ................... 0021279.5

(51) Int. Cl.
*G06F 9/00* (2006.01)
(52) U.S. Cl. ...................... 380/270; 380/272
(58) Field of Classification Search ............... 380/270, 380/272
See application file for complete search history.

(56) References Cited

U.S. PATENT DOCUMENTS

| | | | | |
|---|---|---|---|---|
| 4,890,315 A | * | 12/1989 | Bendixen et al. | 455/554.2 |
| 4,972,457 A | * | 11/1990 | O'Sullivan | 455/556.1 |
| 5,027,427 A | * | 6/1991 | Shimizu | 455/517 |
| 5,425,076 A | * | 6/1995 | Knippelmier | 379/27.04 |
| 5,490,288 A | * | 2/1996 | Wiatrowski | 455/517 |
| 5,542,120 A | * | 7/1996 | Smith et al. | 455/425 |
| 5,794,142 A | | 8/1998 | Alanara et al. | |
| 6,088,457 A | | 7/2000 | Parkinson et al. | |

FOREIGN PATENT DOCUMENTS

| | | |
|---|---|---|
| DE | 195 43 843 A | 5/1997 |
| WO | WO 92/17943 | 10/1992 |

OTHER PUBLICATIONS

Gamoran et al, "Infrastructure Independent Over-the-Air Silent Operations and Maintenance (O&M) and Software Download", Sep. 1999, Motorola Technical Developments, vol. 39, pp. 153-154.
Moessner et al, "Terminal Reconfigureability—The Software Download Aspect", Mar. 27, 2000, International Conference on 3G Mobile Communication Technologies, XX, XX, Nr. 471, pp. 326-330.

* cited by examiner

*Primary Examiner*—Thomas R. Peeso
(74) *Attorney, Agent, or Firm*—Squire, Sanders and Dempsey, LLP.

(57) ABSTRACT

A method of managing a wireless device (2), the method comprising installing a management agent program in a memory of the wireless device (2), the installed management agent monitoring the status of application programs installed on the device. Management instructions are sent to the mobile device (2) from a Management Centre (5) using a wireless telecommunications network (1) and, following a receipt of the management instructions at the device, the management agent processes the instructions and manages the applications accordingly. The management agent reports the results of the processing operation to the Management Centre (5) via the wireless telecommunications network (1).

9 Claims, 2 Drawing Sheets

WIRELESS DEVICE MANAGEMENT

The present invention relates to wireless device management and in particular to the remote management of wireless devices.

The last decade has seen a rapid growth in the number and use of mobile cellular telephones. More recently, wireless devices known as "communicators" have been introduced and combine the functionality of mobile telephones and Personal Digital Assistants (PDAs). It is expected that this area will undergo massive growth in the near future as new cellular telecommunication standards (e.g. GPRS, UMTS, WAP) make possible the high speed transfer of data across the wireless interface.

The next generation of mobile telephones are likely to resemble a minicomputer rather than a telephone per se. Also, whilst to date cellular telephones have been very much manufacturer specific in terms of both hardware and software, future wireless devices are likely to be built on a much more open platform. This will allow the introduction into the devices of third party applications and will further fuel growth in much the same way as Microsoft Windows™ has done for personal computers.

It is to be expected that much of the third party software which will be installable into wireless devices will be associated with a chargeable service and/or will require modification/updating etc after the initial installation.

According to a first aspect of the present invention there is provided a method of managing a wireless device, the method comprising:

installing a management agent program in a memory of the wireless device, the installed management agent monitoring the status of application programs installed on the device;

sending management instructions to the mobile device using a telecommunications network; and receiving the management instructions at the device, the management agent processing the instructions and managing the applications accordingly.

The nature of mobile wireless devices (e.g. lacking input/output facilities such as d drives) means that it is difficult or even impossible to install software applications after devices have been manufactured. Device manufacturers are also reluctant to allow device software to be modified by unauthorised third parties. The invention described here overcomes these problems by allowing device (software) architecture to be modified remotely by operators or authorised third parties. For example, a device may be supplied to a subscriber with a set of preloaded applications. These applications may be subsequently turned on or off be the sending of, an appropriate management instruction from the operator's network to the device. This would avoid the need for a device to be returned to the manufacturer, or to an authorised dealer, merely to implement a software change. The management agent performs a centralised control role in the wireless device.

In certain embodiments of the present invention, the management agent causes reports to be sent back to the origin of the management instructions following the processing of these instructions. For example, a report may contain confirmation that an application has been successfully turned on (installed) or off (uninstalled). These reports may be cryptographically signed.

Preferably, the wireless device is operated by a subscriber to said telecommunications network, which network is a digital cellular telecommunications network. The network may be for example a GSM network or an evolution thereof such as GSM phase 2 (including GPRS) or UMTS.

Preferably, the application programs installed on the device may in an active or inactive state. A switch in the state of a given application may be achieved by sending an appropriate management instruction from the network to the device, whereupon the management agent acts on the instruction to implement said switch.

Preferably, the step of sending management instructions to the mobile device comprises sending these instructions from a management centre of the telecommunications network. However, management instructions may alternatively be sent from an authorised third party management centre.

In one embodiment of the invention, an anti-virus application program is installed in the wireless device and may be switched on or off by a management agent in response to a management instruction sent from the network to the device.

The management agent may control the installation of applications downloaded from the network to the wireless device. For example, these may be new applications requested by the user of the device. The management agent may control the modification of an application or of data associated with an application following the downloading of modifications from the network.

The management agent may send monitored application status information to the telecommunications network. This may be used, for example, for the purpose of charging or to determine which updates should be sent to the device.

Said management instructions may be sent from the network to the mobile device using any appropriate bearer. For example, in a GSM (or UMTS) network instructions may be sent using the Short Message Service (SMS) or Unstructured Supplementary Services Data (USSD) messages. For larger data volumes, a connection oriented (e.g. circuit switched) or connectionless (packet switched) communication channel may be used. It is also possible that an SMS or USSD message may be sent from the network to the device to trigger the setting up of a connection for the transfer of a larger volume of data.

Preferably, in order to ensure a secure connection on top of an open bearer service (such as SMS), management instructions are cryptographically signed. This signature can be used by a wireless device to authenticate the instructions.

The management agent may be used to control and enforce policies on the wireless device. For example, these policies may include security policies including encryption, permitted connections, etc. Polices may be defined by the Management Centre.

According to a second aspect of the present invention there is provided a wireless device arranged to communicate with a telecommunication network, the device comprising:

a memory storing a management agent program and one or more application programs;

processing means for running the management agent to monitor the status of application programs installed on the device; and receiving means for receiving management instructions, sent from the network, and for passing these to the management agent, the management agent being arranged to process the instructions and manage the applications accordingly.

The wireless device may be for example a mobile telephone, communicator, PDA, palmtop computer, or laptop computer.

For a better understanding of the present invention and in order to show how the same may be carried into effect reference will now be made by way of example to the accompanying drawings in which.

Figure 1:
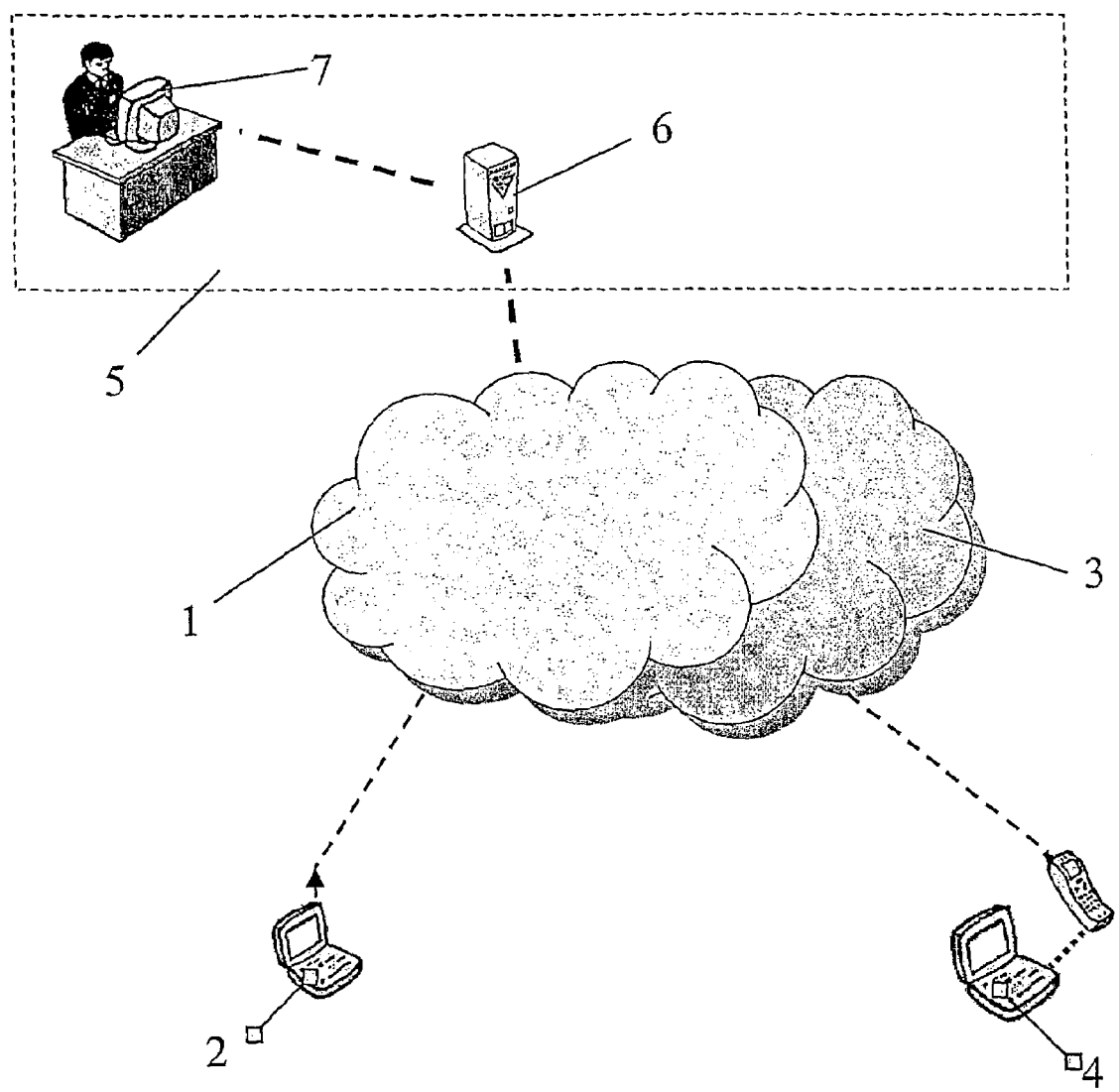
FIG. 1 illustrates schematically a management system for a wireless device.

There is illustrated in FIG. 1 a Public Land Mobile Network (PLMN) 1 which is the home network of a subscriber using a wireless device 2. The device 2 illustrated is a communicator type device. For the purpose of the following discussion, the PLMN 1 is assumed to be a GSM network. A second PLMN 3 is illustrated in the Figure, and this PLMN may represent a foreign or visited network for a roaming subscriber (using a wireless device 4) whose home network is also the PLMN 1.

Within the PLMN 1, the network operator is provided with a Management Centre 5 comprising a Management Server 6 and a Management Console 7. The Management Server 6 is connected to the communication backbone of the PLMN 1, e.g. to an MSC (not shown in the Figure). Via the Management Console 6, the operator is able to send SMS messages and data to devices such as the devices 2,4, and receive the same from these devices. Policies such as access rights, application availability, security etc., are defined at the management centre for individual (or classes of) subscribers.

The devices 2,4 each have a memory storage means into which a number of application programs are pre-loaded by the manufacturer or by the device supplier. These applications may comprise a phone application (used for making and controlling phone calls), a contacts database, a word processor, and one or more security applications such as an anti-virus application. The memory also contains a device operating system such as the EPOC, Windows CE™, PalmOS™, or Mobile Linux operating systems.

Figure 2:
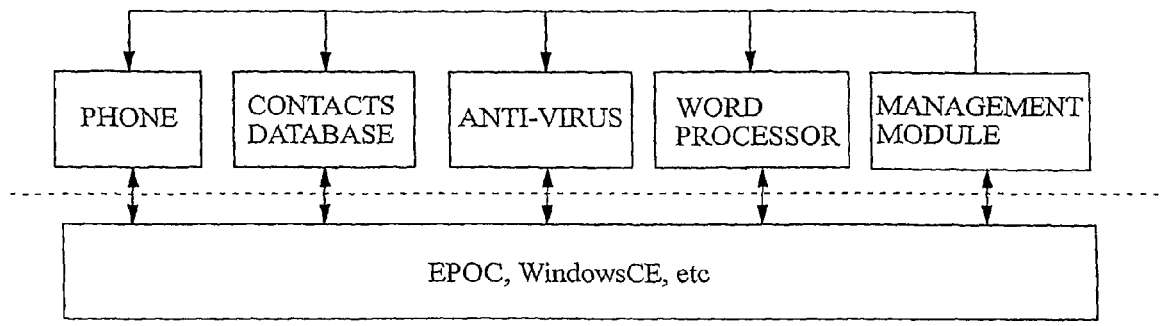
FIG. 2 illustrates schematically the software architecture of a wireless device.

The memories of the devices 2,4 are each additionally pre-loaded with a management agent program, the primary function of which is to allow for the remote control of the device resident applications (and for the installation, deletion, and updating of applications) from the Management Centre 5 of the network 1. The software architecture of the devices 2,4 is illustrated in FIG. 2, from which it will be apparent that the management agent may issue commands through the operating system or directly to other applications installed in the device. The management agent may for example be able to delete or copy files by issuing operating system commands. The management agent performs a central control role in the mobile wireless device, and all requests, configurations, downloads, etc, are funnelled through the management agent.

Consider now the situation where the operator of the PLMN 1 wishes to deactivate or activate an application resident in the memory of the wireless device 2. This action may follow, for example, a request received from the device user (e.g. in an SMS message or via a telephone call). The operator initiates the sending of an appropriate management instruction from the Management Console 7. The instruction contains the identity of the application to be controlled, and the action to be taken. The instruction is cryptographically signed to authenticate the instruction, and is passed to the Management Server 6 which relays the instruction to the MSC of the network 1 in the payload of an SMS message (NB. where the instruction length exceeds the maximum payload of an SMS message, the instruction may be segmented and sent in two or more "concatenated" SMS messages). The header of the SMS payload contains the telephone number of the destination device 1.

The network 1 causes the SMS message to be delivered to the device 1. Following acceptance of the message by the device user, the management instruction contained in the SMS message is passed to the management agent. The management agent first authenticates the instruction (using the cryptographic signature), and then analyses the instruction and acts accordingly, i.e. to activate or deactivate an application resident in the device's memory.

It will be appreciated that the mechanism described here allows operators and software vendors to maintain control over who may use their software, and moreover allows this to be achieved in an extremely flexible manner. For example, users may be charged a licence fee for a fixed time period and, after that time has expired and the user has not renewed the licence, the software in the user's device may be inhibited.

A similar mechanism may be used to update an application of the device 2, or to update data associated with an application. Consider for example an anti-virus application installed and active on the device 2. Typically, anti-virus applications rely upon previously identified virus signatures to identify viruses in scanned data. These signatures are stored in a database. Database updates may be sent from the Management Centre 5 to the wireless device 2 in a management instruction (using SMS messages), where they are received by the management agent. After authentication of the instruction, the management agent proceeds to update the virus signature database in the memory of the device 2. The anti-virus software itself may be updated using a similar mechanism.

An important function of the management agent is that of reporting to the Management Centre 5. The management agent may report for example the successful installation of a new application, or the failure of an instructed installation. This allows the Management Centre 5 to maintain an accurate record of the status of a mobile device.

In the above examples, the Management Centre 4 "pushes" information and data to the wireless devices. Where the volume of data to be sent from the Management Centre 5 is large, an SMS message may be used as a trigger for establishing some other bearer channel having a greater bandwidth and via which data may be "pulled" to a wireless device. For example, in the case of an application or data update, a trigger SMS message may be sent from the Management Centre 5, asking the subscriber to establish a data call to the Management Server 6. Once this connection is established, the update can be downloaded to the device 1.

Figure 3:
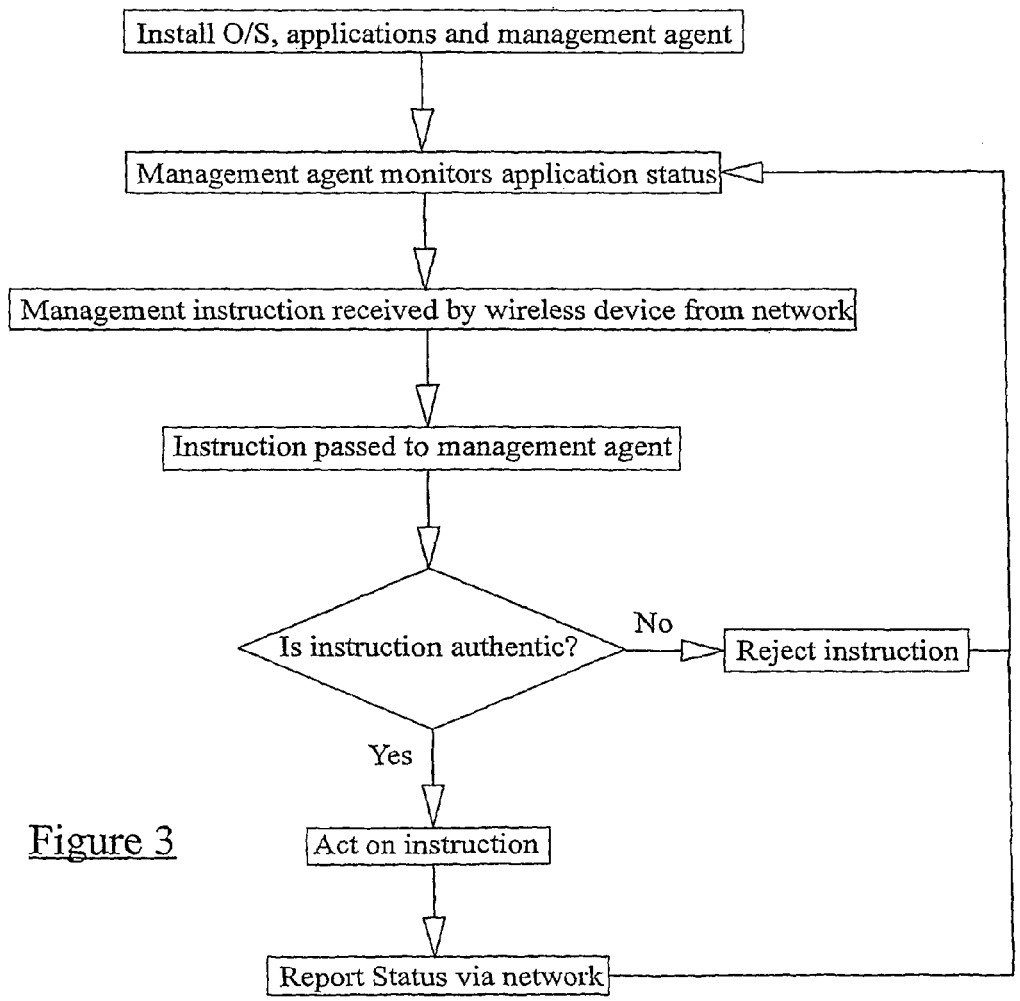
FIG. 3 is a flow diagram illustrating a method of operation of the system of FIG. 1.

FIG. 3 is a flow diagram further illustrating the main steps in a method of remotely managing applications of a wireless device using the management agent concept.

It will be appreciated by the person of skill in the art that various modifications may be made to the above described embodiments without departing from the scope of the present invention. For example, in the system described the management centre 5 is located within the PLMN 1 (or at least is controlled by the operator of the PLMN 1). However, the Management Centre 5 may instead be operated by a third party, for example the vendor of application software or by some independent service provider who may charge users and/or application vendors a commission. In some cases, the Management Console 7 may be operated by a third party with the Management Server 6 being operated by the PLMN operator. In another modification to the above described embodiment, the management agent may be incorporated into the device operating system (EPOC, WindowsCE™, etc), rather than being a standalone application.

The invention claimed is:

1. A method of managing a mobile wireless device, the method comprising:
   installing a management agent in a memory of the wireless device, the installed management agent monitoring the status of the device and of applications installed on the device;
   sending management instructions to the mobile wireless device using a wireless telecommunications network;
   receiving the management instructions at the mobile wireless device, the management agent processing the instructions and managing the applications accordingly, wherein the application programs installed on the mobile wireless device are in an active or inactive state, and a switch in the state of a given application is achieved by sending an appropriate management instruction from the network to the device, whereupon the management agent acts on the instruction to implement said switch; and
   following processing of the instructions, returning corresponding reports from the management agent to the origin of the instructions, the reports indicating whether or not requested switches have been successfully completed or have failed,
   wherein management instructions are sent to the mobile wireless device from an authorised third party management centre.

2. A method according to claim 1, wherein the mobile wireless device is operated by a subscriber to said wireless telecommunications network, which network is a digital cellular telecommunications network.

3. A method according to claim 1, wherein the step of sending management instructions to the mobile wireless device comprises sending these instructions from a management centre of the telecommunications network.

4. A method according to claim 1, wherein the management agent controls the installation of applications downloaded from the network to the mobile wireless device.

5. A method according to claim 1, wherein the management agent controls the modification of an application or of data associated with an application following the downloading of modifications from the network.

6. A method according to claim 1, wherein the management agent sends monitored application status information to the telecommunications network.

7. A method of managing a mobile wireless device, the method comprising:
   installing a management agent in a memory of the wireless device, the installed management agent monitoring the status of the device and of applications installed on the device;
   sending management instructions to the mobile wireless device using a wireless telecommunications network;
   receiving the management instructions at the mobile wireless device, the management agent Processing the instructions and managing the applications accordingly, wherein the application programs installed on the mobile wireless device are in an active or inactive state, and a switch in the state of a given application is achieved by sending an appropriate management instruction from the network to the device, whereupon the management agent acts on the instruction to implement said switch; and
   following processing of the instructions, returning corresponding reports from the management agent to the origin of the instructions, the reports indicating whether or not requested switches have been successfully completed or have failed,
   wherein an anti-virus application program is installed in the wireless device and is switched on or off by a management instruction sent from the network to the mobile wireless device.

8. A method of managing a mobile wireless device, the method comprising:
   installing a management agent in a memory of the wireless device, the installed management agent monitoring the status of the device and of applications installed on the device;
   sending management instructions to the mobile wireless device using a wireless telecommunications network;
   receiving the management instructions at the mobile wireless device, the management agent processing the instructions and managing the applications accordingly, wherein the application programs installed on the mobile wireless device are in an active or inactive state, and a switch in the state of a given application is achieved by sending an appropriate management instruction from the network to the device, whereupon the management agent acts on the instruction to implement said switch; and
   following processing of the instructions, returning corresponding reports from the management agent to the origin of the instructions, the reports indicating whether or not requested switches have been successfully completed or have failed,
   wherein the network is a GSM or UMTS network and said management instructions are sent from the network to the mobile wireless device using the Short Message Service (SMS) or Unstructured Supplementary Services Data (USSD) messages.

9. A method of managing a mobile wireless device, the method comprising:
   installing a management agent in a memory of the wireless device, the installed management agent monitoring the status of the device and of applications installed on the device;
   sending management instructions to the mobile wireless device using a wireless telecommunications network;
   receiving the management instructions at the mobile wireless device, the management agent Processing the instructions and managing the applications accordingly, wherein the application programs installed on the mobile wireless device are in an active or inactive state, and a switch in the state of a given application is achieved by sending an appropriate management instruction from the network to the device, whereupon the management agent acts on the instruction to implement said switch; and
   following processing of the instructions, returning corresponding reports from the management agent to the origin of the instructions, the reports indicating whether or not requested switches have been successfully completed or have failed,
   wherein in order to ensure a secure connection on top of an open bearer service management instructions are cryptographically signed.

* * * * *